(12) United States Patent
Hung et al.

(10) Patent No.: US 8,549,525 B2
(45) Date of Patent: Oct. 1, 2013

(54) METHOD FOR TUNING SERVICE PERFORMANCE OF MULTI-TASK SYSTEM AND MULTI-TASK SYSTEM THEREOF

(75) Inventors: Kuo-Hsien Hung, Hsinchu (TW); Lin Yu Hsiang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 1629 days.

(21) Appl. No.: 11/681,819

(22) Filed: Mar. 5, 2007

(65) Prior Publication Data

US 2007/0226742 A1    Sep. 27, 2007

Related U.S. Application Data

(60) Provisional application No. 60/784,720, filed on Mar. 22, 2006.

(51) Int. Cl.
*G06F 9/46* (2006.01)

(52) U.S. Cl.
USPC ............ 718/103; 718/100; 718/102; 718/107

(58) Field of Classification Search
USPC .................. 718/103, 102, 104, 107, 100, 101
See application file for complete search history.

(56) References Cited

U.S. PATENT DOCUMENTS

| | | | | |
|---|---|---|---|---|
| 5,528,513 A * | 6/1996 | Vaitzblit et al. | ............... | 718/103 |
| 6,052,580 A * | 4/2000 | Khakoo | ........................ | 455/418 |
| 6,092,095 A * | 7/2000 | Maytal | ........................ | 718/100 |
| 6,604,200 B2 * | 8/2003 | Zack et al. | .................... | 713/320 |
| 7,292,847 B2 * | 11/2007 | Nogueiro et al. | ............. | 455/418 |
| 2002/0124043 A1 * | 9/2002 | Otero Perez et al. | ......... | 709/107 |
| 2004/0088704 A1 * | 5/2004 | Owen et al. | .................... | 718/100 |
| 2010/0050184 A1 * | 2/2010 | Lin et al. | ...................... | 718/107 |

FOREIGN PATENT DOCUMENTS

CN    1773457    5/2006

OTHER PUBLICATIONS

CN Office Action mailed Jun. 19, 2009.
English abstract of CN1773457.
English translation of "Study on Transmission Control in Wireless Media Streaming" Mao Fenxia, Master Dissertation of Huazhong University of Science and Technology, Dec. 31, 2006.
DE Office Action mailed May 13, 2009 and English translation.
"Advances in Channel-Adaptive Video Streaming" Girod, B., et al.; Proceedings of the 2002 International Conference on Image Processing, 2002. vol. 1, pp. I-9-I-12.
Steinmetz, R.; "Analyzing the Multimedia Operating System;" IBM Eur. Networking Center, Heidelberg, Multimedia, IEEE, Spring 1995.
Tang Ziying et al.; "Computer Operating Systems;", Xidian University Publisher, pp. 39-52 and pp. 96-119, Dec. 31, 1996.
English language translation of pertinent parts of "Computer Operating Systems."
DE Office Action mailed Apr. 29, 2008.
Margaritidis et al. "Adaptation Techniques on Wireless Ubiquitous Internet Multimedia", Journal on Wireless Communications & Mobile Computing, vol. 1, (Jan. 2001).

* cited by examiner

*Primary Examiner* — Emerson Puente
*Assistant Examiner* — Willy W Huaracha
(74) *Attorney, Agent, or Firm* — McClure, Qualey & Rodack, LLP

(57) ABSTRACT

A method for executing a first and a second task in M time units is disclosed. The method includes comparing the priority of the first task and the task. If the first task has a higher priority than the second task, the first task is executed. The first task is then suspended after the first duration, and the second task is executed for a second duration.

14 Claims, 5 Drawing Sheets

METHOD FOR TUNING SERVICE PERFORMANCE OF MULTI-TASK SYSTEM AND MULTI-TASK SYSTEM THEREOF

CROSS REFERENCE TO RELATED APPLICATIONS

This application claims the benefit of U.S. Provisional Application No. 60/784,720, filed Mar. 22, 2006, and entitled "A Performance Tuning Technique Applied On A Multi-Task System With Real-Time Multimedia Streaming Service".

BACKGROUND OF THE INVENTION

1. Field of the Invention

The present invention is related to streaming service systems and methods, and more particularly to a multi-task system and a method for tuning a service performance of the same.

2. The Related Art

As technology improves, a mobile phone tends to equip with an ever increasing number of functions. For example, in addition to making or receiving a call, a mobile phone may function as a multimedia player, a camera, an organizer, or even as a web-surfing machine. With those multi-applications, the mobile phone usually utilizes a multi-task processing core to handle those various functions.

Since system resources, such as computing capacity, of mobile phones are usually very limited, to control multi-functions executed at the same time, the multi-task processing core needs to prioritize each task of the multi-functions. Often a real-time multimedia streaming service has a higher priority than other tasks. When a multi-task handheld device transmits multimedia streams into a network, the real-time multimedia streaming service adjusts the transmission bit rate according to the network bandwidth. For example, when the network bandwidth is unstable, the real-time multimedia streaming service decreases a transmission bit rate to retain a quality of service (QoS). If the network bandwidth is stable and sufficient, the real-time multimedia streaming service increases the transmission bit rate to provide a better multimedia quality of service, at expenses of an increased processing time and a lower QoS of any other low priority task. As a result, the low-priority task might not be executed on schedule.

FIG. 1 shows a timing diagram of a typical multi-task system. Suppose a multi-task system has a first task and a second task to be executed, where the first task is a real-time task and is required to be completed in M time period. The second task is not a real-time task and is of a long working duration. Typically, the multi-task system runs the first task and the second task with different threads, to ensure the two tasks thereof may be executed within M time period. In FIG. 1, four threads A, B, C, and D with priorities ranked as A>B>C>D are presented, where thread A indicates an interrupt service routine (ISR) task executed once every M time periods, which can be used to control the task assignment of the threads B and C. In this embodiment, the threads A, B, and C are considered as a first task and the thread D, with the lowest priority, is considered as a second task. In FIG. 1, the first task occupies unlimited resources, and thus the executing of the second task is influenced. For example, from time scale 2M to 3M, only few processing time is left for the second task. The situation is more severe when the first task is a source/channel encoding and the second task is a non real-time task, such as a file transferring.

FIG. 2 shows a timing diagram of a multi-task streaming service system executing multi-task. The threads A, B, and C are considered as a first task and the thread D, with the lowest priority, is considered as a second task. The first task is a source/channel encoding process in the embodiment. Threads A, B, and C are all required to complete the first task in M time period. During time scale 0 to M, the multi-task system assigns an initialized encoding bit rate according to multimedia source content. The initialized encoding bit rate may be different by application, hence the exact value is not show here. The first task is done within M period, and the rest of time is used to executing thread D. The first task is completed in M time period, which indicates that the real-time constraint of the first task is satisfied. Thus the encoding bit rate is increased in time units M to 2M to improve the quality at the end user. The encoding bit rate is further increased in time units 2M to 3M since that the first task can be done by 2M time unit. During time units 3M to 4M, the first task is not completed in previous M time period, in other words, the encoding bit rate is too high to satisfy the real-time requirement. Therefore, the encoding bit rate is reduced from time units 3M to 4M. Beyond 4M time units, the encoding bit rate is retained if the network quality is stable. FIG. 2 shows that the processing time of the multi-task streaming service is proportional to the streaming bit rate, threads A, B and C, occupying all processing time and considerably delaying tasks with low priority, for example, no processing time is designated to thread D after M time units.

For multi-task systems with limited processor computing power, such as handset or a PDA, when playing multimedia files via an external playing device through wired or wireless channels, such as Bluetooth, GPRS, Wi-Fi, decreasing service quality of low priority threads results in retarding the man machine interface, freezing frames of image decoding and postponing file transfer.

BRIEF SUMMARY OF THE INVENTION

Accordingly, a method of a high priority task withdrawing processing time for retaining the QoS of low priority tasks is disclosed in the invention.

In one aspect of the invention, a streaming service system for executing a first and a second task in M time units is provided. The streaming service system comprises a processor. The processor compares the priority of the first task and the second task, executes the first task for a first duration, wherein the first task has a higher priority than the second task, and suspends the execution of the first task after the first duration and executing the second task for a second duration processes.

In another aspect of the invention, a method for executing a first and a second task in M time is also provided. First, the priority of the first task and the priority of the second task are compared. If the first task has a higher priority than the second task, the first task is executed for a first duration. The execution of the first task is suspended after the first duration, and the second task is executed for a second duration. In some embodiments, the ratio between the first duration and second duration is a constant. In other embodiments, the first duration is proportional to a parameter, and the second duration is N time units. The parameter is increased if the first and the second task can be completed within M time units, where N is a number less than M; otherwise, the parameter is decreased.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 1:
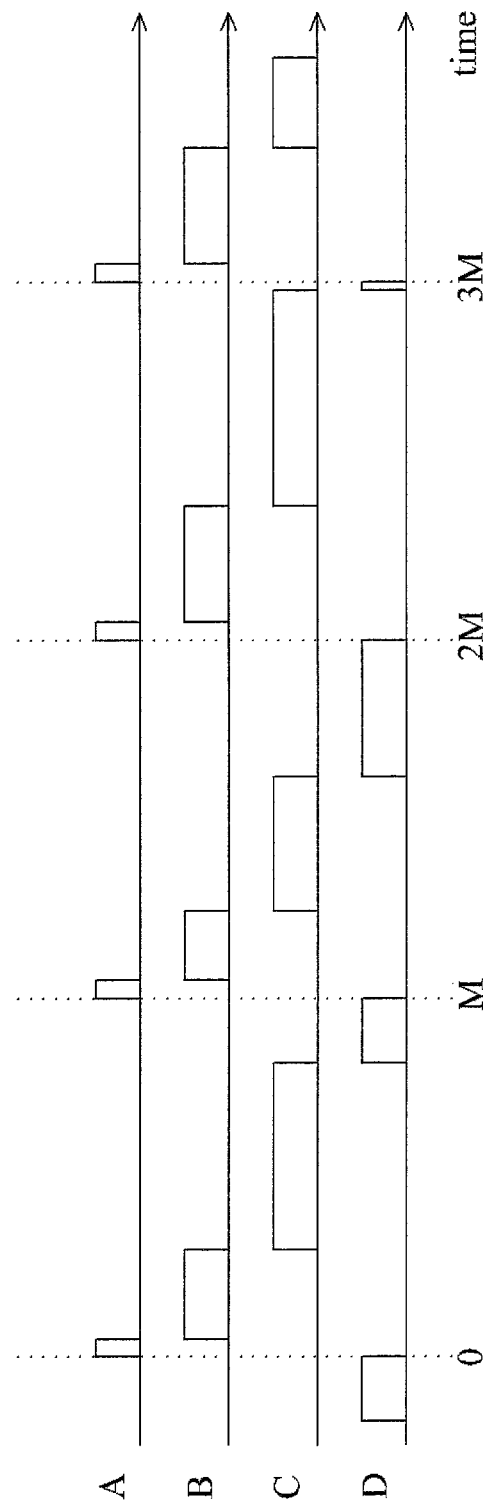
FIG. 1 shows a timing diagram of a conventional multi-task system.
Figure 2:
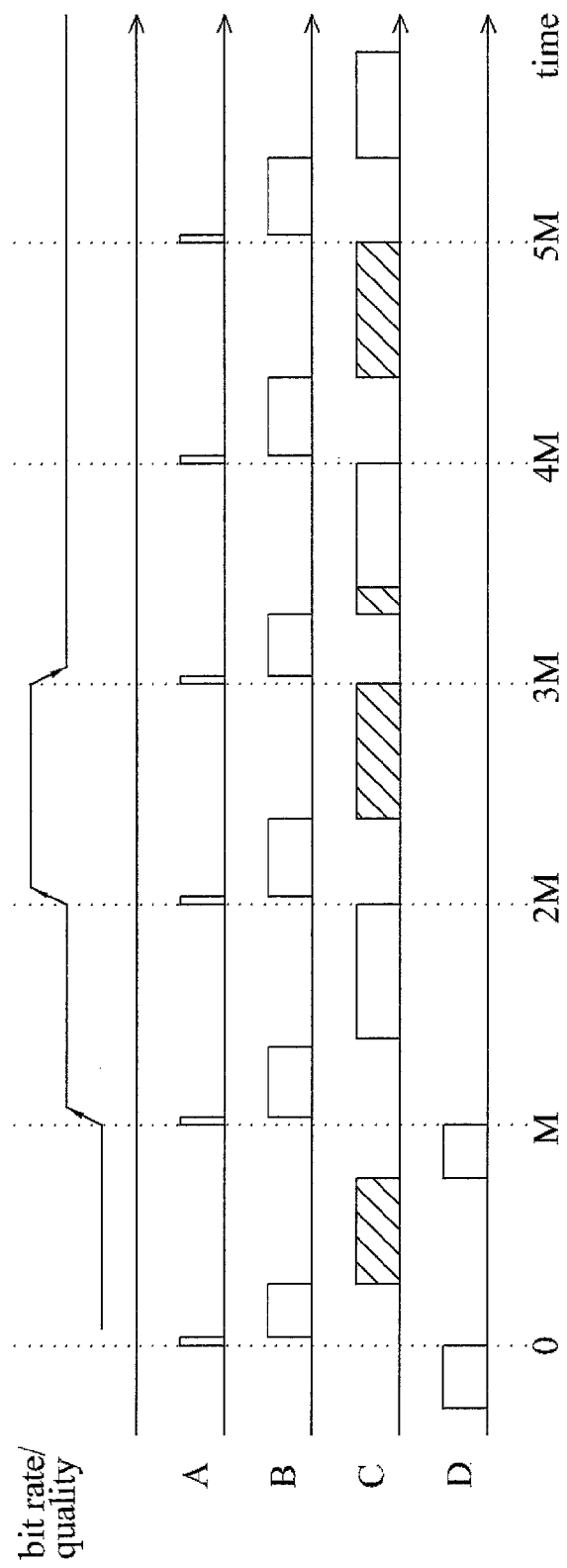
FIG. 2 shows a timing diagram of a conventional multi-task system with a postponed low priority task.
Figure 3:
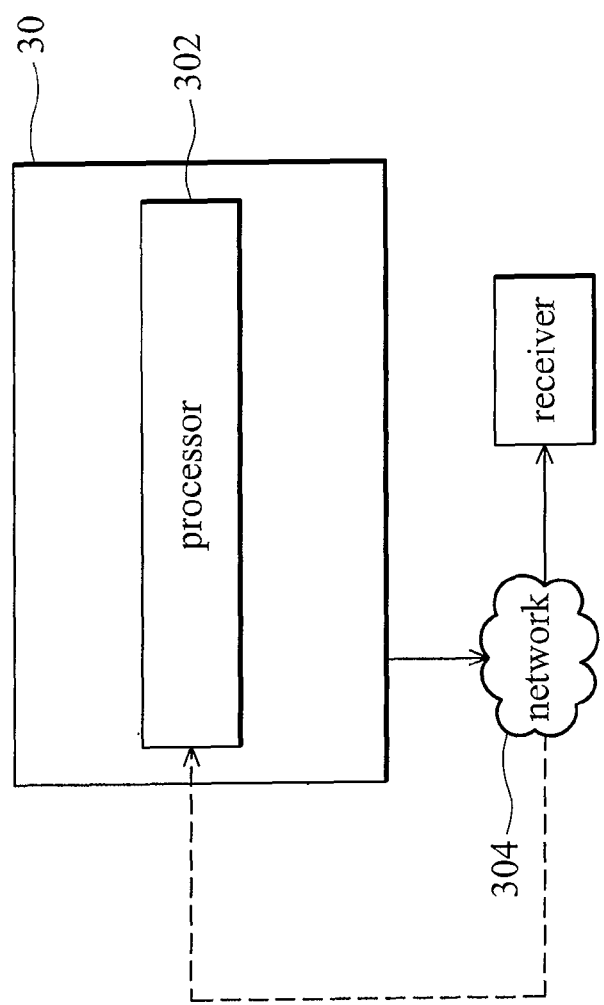
FIG. 3 shows a streaming service system for executing a first and a second tasks in M time units.

FIG. 3 shows a streaming service system for executing a first and a second task in M time units. The streaming service system 30 comprises a processor 302. The processor 302 processes a first task to generate a first data, and transmits the first data into a network 304 in a transmission rate. The processing time of the first task is proportional to a parameter. The processor 302 holds the first task for N time units when the first task has the right to be executed. When the first task is held, the processor 302 executes a second task. The processor 302 executes the first task after N time units. The processor 302 executes the second task when the first task is completed within M time units. The parameter is adjusted by the processor 302 according to a network bandwidth and the processing time of the first task. In some embodiments, first task is a multimedia source encoding and a channel encoding, and the parameter is an encoding bit rate or encoding quality. For example, the first task may be a MPEG encoding, a convolutional encoding or a Reed-Solomon encoding process. The encoding quality of a MPEG encoder is proportional to the inverse of the compression rate. The encoding bit rate of a channel encoder indicates how many redundant bits are added to the original data. The more redundant bits are added, the more precise the protection of the original data, however, the size of the encoded data also increases. System 30 encodes the source data and transmits the encoded data into a network. Increasing the encoding quality or channel encoding bit rate provided more robust protection of the encoded data against channel noise, thus, an end user receiving the encoded data can successfully decode the encoded data. The data size with larger encoding rate is larger and requires more processing time. Thus, only if the first task can be completed within M time units, which means the multimedia can be played in real-time, can the processor 302 increase the parameter. Otherwise, the processor 302 decreases the parameter. In some cases, the parameter decreases when the network bandwidth is less than the encoding rate. The parameter must be decreased so that the encoded data can be transmitted to the network smoothly. In some embodiments, the second task may be a man-machine interfacing, image decoding, file transferring, or other non real-time task. According to the streaming service system of these embodiments, the quality of service of these non real-time tasks is maintained.

Figure 4:
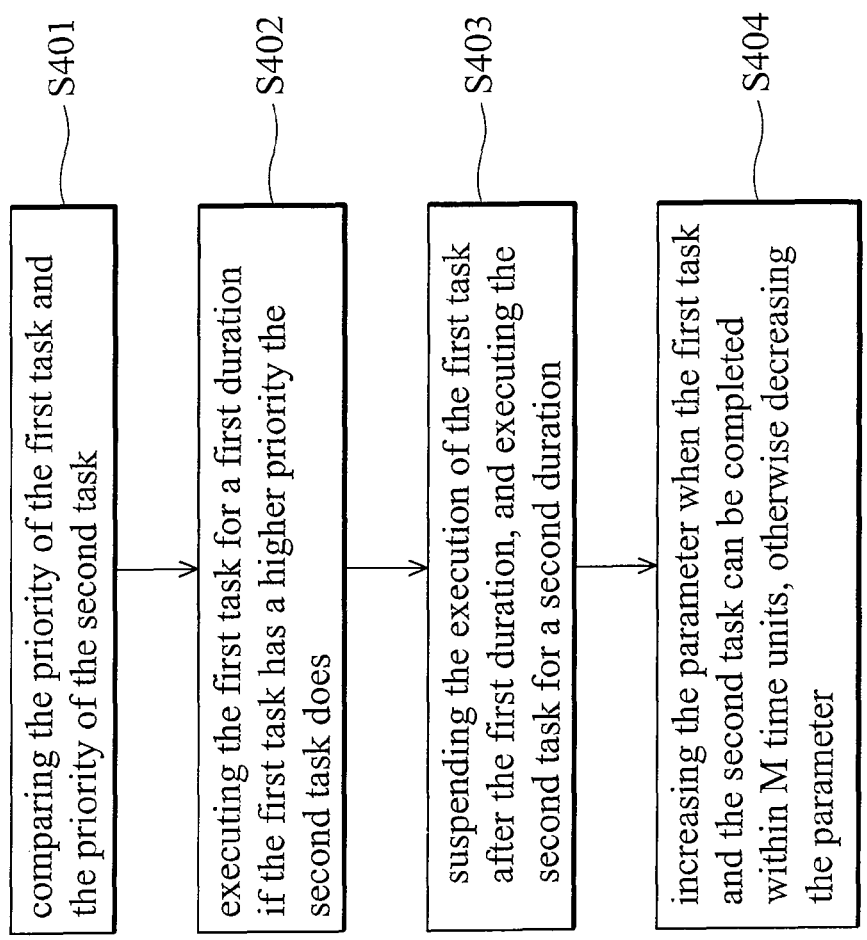
FIG. 4 shows a flowchart of a method for executing a first and a second tasks in M time units.

FIG. 4 shows a flowchart of a method 40 for executing a first and a second task in M time units according to another aspect of the invention. In step 401, the priority of the first task and the priority of the second task are compared. If the first task has a higher priority than the second task, the first task is executed for a first duration in step 402. The execution of the first task is suspended after the first duration, and the second task is executed for a second duration in the step 403. In some embodiments, the ratio between the first duration and second duration is a constant. In other embodiments, the first duration is proportional to a parameter, and the second duration is N time units. The parameter is increased if the first and the second task can be completed within M time units, where N is a number less than M; otherwise, the parameter is decreased.

Figure 5:
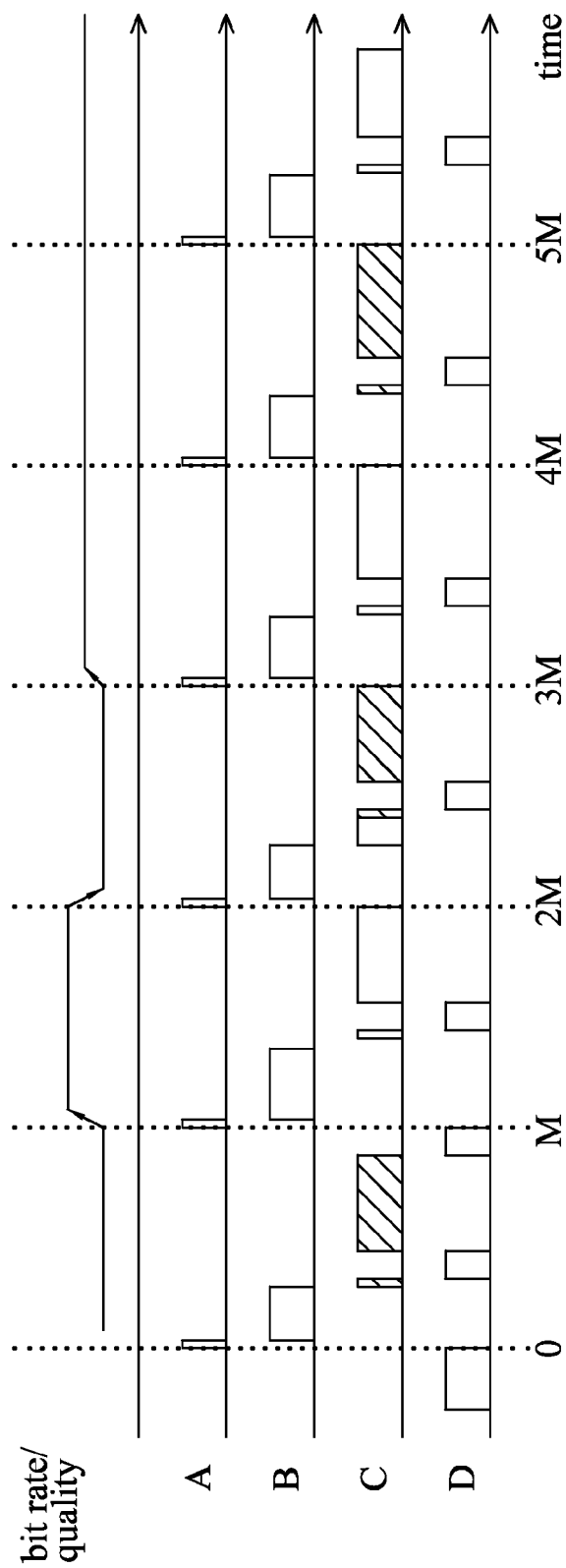
FIG. 5 shows a timing diagram of a parameter, a first and a second tasks.

FIG. 5 shows a time diagram of the parameter, the first and the second task for further illustrating the flow of method 40 and the streaming service device 30. From 0 to M time units, the parameter of the first task is initialized. Since the first task is completed before M time units, the parameter of the first task is raised during M to 2M time units. The parameter of the first task can be encoding bit rate, encoding quality, etc. Increasing the parameter may enhance the playing quality at the receiving end. Duration 2M to 3M time units, the controller finds the packet of the first task is not completed in the previous M time units, indicating the current encoding bit rate is too high, and the network bandwidth or system computing power is incapable of satisfying the real-time requirement, thus decreasing the encoding bit rate and restoring it to the previous setting. During time units 3M to 4M, the controller finds the packet is completed within M time units, indicating the real-time performance is satisfactory, thus, fine adjustment of the encoding bit rate again performed to enhance quality. After 4M time units, the parameter remains if the network quality is stable.

A higher encoding bit rate results in better quality. When the network bandwidth or the server computation power is insufficient of satisfying the requirement of the encoding bit rate, however, a user at the receiving end is not able to enjoy the real-time multimedia service. Thus a channel encoder typically requires a controller adjusting an output bit rate of the source encoding based on network conditions or system traffic to meet both playback quality and real-time constraints. When the network quality is low or the server computation power is insufficient, decreasing the encoding bit rate can reduce the need for network bandwidth and the processing time of the encoder. Thus the real-time constraint at the playing end is maintained at the cost of playback quality. When the network quality is stable and the server computation power is sufficient, the encoding bit rate is increased to meet the real-time constraint while providing better playback quality.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling the execution of a first task and a second task over a system in a periodical time frame of M time units, comprising:

executing the first task, wherein the first task has a higher priority than the second task; and before the execution of the first task is completed, suspending the execution of the first task in each periodical time frame of M time units, to preserve at least some of system resource for the second task, wherein the first task is executed for a first duration before the execution of the second task, the second task is executed for a second duration and a ratio between the periodical time frame of M time units and the second duration is constant.

2. The method as claimed in claim 1, wherein the ratio between the first duration and the second duration is constant.

3. The method as claimed in claim 1, wherein the first duration is proportional to a parameter, the method further comprising increasing the parameter when the first task and the second task are completed in M time units.

4. The method as claimed in claim 3, further comprising decreasing the parameter when the first task can not be completed in M time units.

5. The method as claimed in claim 3, further comprising initializing the parameter so that the first and the second tasks are completed within M time units.

6. The method as claimed in claim 1, wherein the first task is realized by at least two threads, a first and a second thread, the first thread is an interrupt service routine executed once every M time units, and the second thread is executed succeeding the first thread.

7. The method as claim in claim 6, wherein the first task is a real-time task, and the second thread is source coding and channel coding.

8. The method as claimed in claim 7, wherein the second task is a man-machine interfacing, image decoding, or file transferring.

9. A streaming service system for executing a first and a second task in a periodical time frame of M time units, comprising a processor executing the first task, wherein the first task has a higher priority than the second task, and wherein before the execution of the first task is completed, the execution of the first task is suspended in each periodical time frame of M time units, to preserve at least some of system resource for the second task, wherein the first task is executed for a first duration before the execution of the second task, the second task is executed for a second duration and a ratio between the periodical time frame of M time units and the second duration is constant.

10. The streaming service system as claimed in claim 9, wherein the first duration is proportional to a parameter.

11. The streaming service system as claimed in claim 10, wherein the processor increases the parameter when the first task and the second task are completed in M time units and decreases the parameter when the first and second task can not be completed in M time units.

12. The streaming service system as claimed in claim 11, wherein the first task is a real-time task.

13. The stream service system as claimed in claim 12, wherein the parameter is a source encoding rate or a channel encoding rate.

14. The streaming service system as claimed in claim 9, wherein the second task is man-machine interfacing, image decoding, or file transferring.

\* \* \* \* \*